July 28, 1942.  W. B. WOODY  2,291,014
JOINT STRUCTURE
Filed May 5, 1941
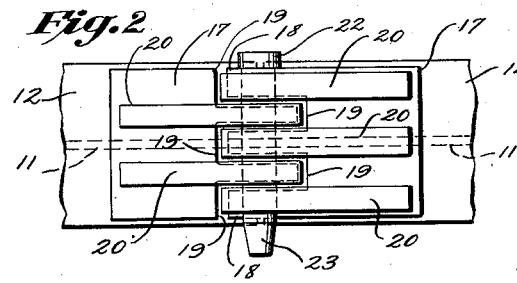
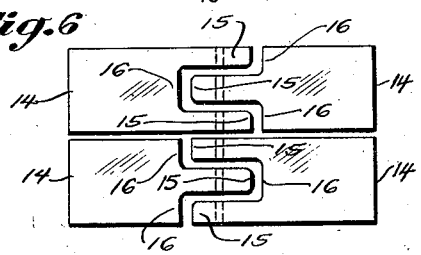
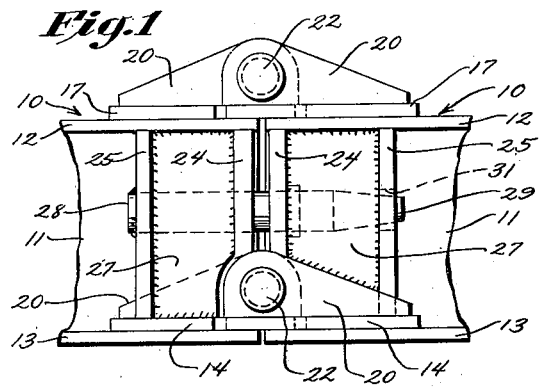
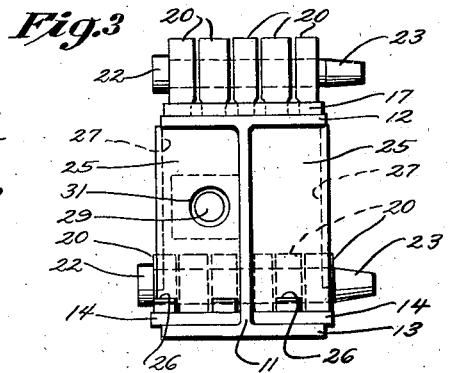
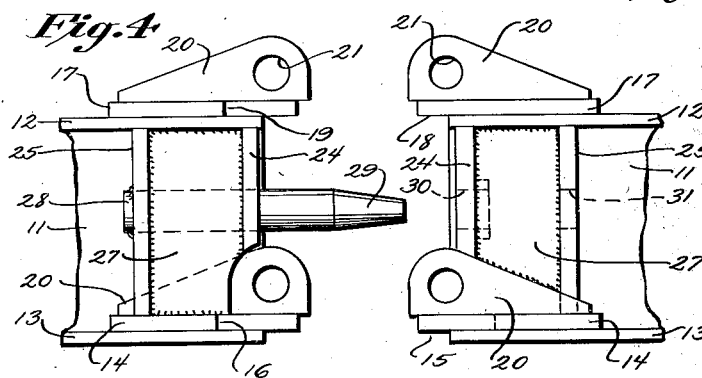
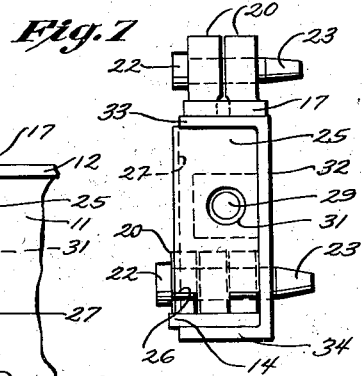
Wayland B. Woody
INVENTOR
BY
ATTORNEY Patented July 28, 1942

2,291,014

UNITED STATES PATENT OFFICE 2,291,014

JOINT STRUCTURE

Wayland B. Woody, Tulsa, Okla., assignor to Franks Manufacturing Corporation, Tulsa, Okla., a corporation of Oklahoma Application May 5, 1941, Serial No. 391,920

4 Claims. (Cl. 189—36)

This invention relates to structural members and particularly to joint constructions for uniting the ends of structural members.

A principal object of this invention is to provide an improved construction for joining the ends of structural members which will produce a joint having a strength for all loading conditions which is at least as great as that of the structural members themselves.

Another object is the provision of an end construction for structural members which is particularly adapted to permit accurate end-wise connection of such structural members while under heavy load in a joint of great strength and rigidity.

The joint construction in accordance with this invention is especially adapted for connecting together the abutting ends of flanged structural members such as H-beams, I-beams, channels and the like, all of which may be classified as generally channel-shaped, to provide a joint of great strength which is also readily separable into its component members, without cutting or destroying any of the joining elements.

A particular advantage of the joint construction in accordance with this invention is that it provides means for joining together the abutting ends of large beams by the use of simple shear or drift pins and by this means, the beams may be very quickly and easily assembled and disassembled.

These and other objects and advantages of this invention will become apparent from the following detailed description when read in conjunction with the accompanying drawing illustrating useful embodiments in accordance with this invention. It will be understood that various alterations and modifications may be made in the details of the construction herein described and illustrated by way of example, without departing from the spirit of this invention and within the scope of the appended claims.

In the drawing:

Fig. 1 is a side elevation showing a pair of structural members assembled with the joint construction in accordance with this invention.

Fig. 2 is a plan view of the assembled structure illustrated in Fig. 1.

Fig. 3 is a right hand end elevation of the structure of Fig. 1.

Fig. 4 is a view of the ends of the structural members in spaced relation before being joined in the assembled structure shown in Fig. 1.

Figs. 5 and 6 are details of some of the elements of the joint structure, and

Fig. 7 is an end elevational view similar to Fig. 3 of the new joint structure applied to another shape of structural member.

Referring to the several figures of the drawing in which like reference numerals represent the same or similar parts in each of the figures, the numerals 10—10 generally represent the end portions of abutting structural members. For the purpose of illustration, the structural members shown by the drawing, particularly in Figs. 1 to 6, inclusive, are H-beams, although it will be understood that members of other standard structural shapes may be employed and joined in similar manner as will appear hereinafter. Each of the members 10 has the usual central web 11 and top and bottom flanges 12 and 13, respectively, extending on opposite sides of the webs 11 and enclosing the usual channels formed thereby on opposite sides of the webs. On the upper surface of each of the bottom flanges 13 is affixed a spacer plate 14, there being two of these plates for each of the members, one on each side of the web 11. One end of each of the plates 14 extends beyond the end of the member to which it is attached, and the extended end is provided with tongues 15 and grooves 16, which are adapted to mutually inter-engage with complementary tongues and grooves on the spacer plate attached to the abutting member. These plates and their relationship in assembled position are shown most clearly in Fig. 6. Spacer plates 17, having similar complementary tongues 18 and grooves 19, are firmly affixed to the upper surfaces of the top flanges 12. Since there is no intervening web on these surfaces, only one of the plates 17 is provided for each of the members 10. One end of each of the plates 17 extends beyond the end of the structural member to which it is firmly attached for substantially the same distance as plates 14. The form and arrangement of plates 17 when assembled is illustrated particularly in Fig. 5. The tongues 15 and 18 are somewhat narrower than the corresponding grooves 16 and 19 to provide a small amount of clearance between these elements when the joint structure is assembled.

Mounted on each of the tongues 15 and 18 are upstanding lugs 20 each of which is formed from a flat plate having a thickness approximately equal to the width of the corresponding tongue. The lug plates are set on edge on the tongues and are rigidly attached thereto by welding. One end of each of the lugs 20 extends slightly beyond the end of the corresponding tongue and extends longitudinally of the spacer plate to which it is attached to almost the opposite end of that plate. The upper edge of each of the lug plates tapers generally downwardly and rearwardly. The forward end of each of the lugs is rounded and is provided with a transverse aperture 21. The apertures 21 of each group of lugs are in registration transversely of the structural member to which they are attached. The relative positions of the lugs on their respective members are such that when the joint is assembled, as shown particularly in Figs. 1, 2 and 3, the lugs on one of the members 10 will enter the spaces between adjacent lugs on the other member and the apertures 21 of all of the interengaging lugs will then be in transverse registration. The lugs and their apertures are preferably so positioned relative to the ends of the members 10, that when the joint is completed, the axes of the apertures in both the upper and lower groups of lugs will lie substantially in the same vertical plane extending through the center of the joint between the abutting ends of the members 10. As a result the joint structure connecting the members 10 will be substantially symmetrical in all respects about the abutting ends of the members. A drift or shear pin 22, having a tapered point 23, is adapted to pass entirely through all of the apertures 21 in the inter-engaging groups of lugs to thereby lock the members together and complete the joint.

The end of each of the members 10 is provided with front and rear longitudinally-spaced, vertically arranged stiffening or reinforcing elements 24 and 25, respectively. These elements are preferably flat plates which extend vertically through the channels formed by the top and bottom flanges 12 and 13 and extend in width from the outer edges of the flanges to the webs 11, and their edges are rigidly attached to the underside of the top flanges 12 and to the webs 11. Each of the front elements 24 is positioned closely adjacent the end of its respective member 10 and is shorter than the rear element 25 in extending downwardly to the top edges of the lugs 20 to which its lower edge is attached firmly by welding. The rear elements 25 are spaced from the front elements 24 for a distance slightly less than the length of the lugs and their lower edges are rigidly attached to the upper surface of spacer plates 14. The lower edges of the rear elements 25 are notched, as at 26, to receive the rear ends of the lower set of lugs 20, and these notched portions are also rigidly attached to the tops of the intersecting lugs. This arrangement by which the spaced elements 24 and 25 are rigidly united with the flanges, webs and lugs, greatly stiffens the end portions of the members 10 and greatly strengthens the joint when the members are joined together. To complete the bracing of the end portions of the members 10, the areas lying between elements 24 and 25 and flanges 12 and 13 are preferably enclosed by means of flat plates 27, the front and rear edges of which are welded securely to the outer edges of elements 24 and 25, the upper edges are welded to the outer edges of flanges 12, and the lower edges are welded either to the outer edges of plates 14 or to the top edges of the lugs 20 which extend to the side edges of plates 14.

A cylindrical aligning plug 28, having a tapered point 29, extends forwardly through one pair of elements 24 and 25 of one of the members 10 and is rigidly fastened to the elements 24 and 25 by welding. The forward end of plug 28 is adapted to pass through a closely fitting registering aperture 30 in the element 24 of the other member 10 and the point 29 is received in another reistering aperture 31 in element 25 of the other member. Aligning plug 28 and apertured elements 24 and 25 of the other member constitute cooperating aligning means for aligning the ends of the members 10 to thereby bring the groups of lugs 20 into mutually inter-engaging tongue-and-groove relationship, and the apertures 21 in the lugs into correct registration to receive the drift pins 22. The relative diameters of apertures 21 and pins 22 are such as to provide a driving fit for the pins. The diameter of aperture 30 relative to that of plug 28 is such as to provide a close sliding fit for the plug.

Structural members 10, having end construction as above described, are joined by moving the members toward each other to bring the tapered point 29 of plug 28 into aperture 30. As the ends of the members 10 move together, the cooperation of plug 28 the guiding aperture 30 will bring all of the elements of the joint structure into alignment and thus guide the lugs 20 into mutual inter-engagement and apertures 21 into correct registration. Drift pins 22 are then driven through the registering apertures in the groups of inter-engaged lugs and the joint is thereby completed. To break the joint and separate the members, it is only necessary to drive the drift pins 22 out of the lug apertures and move the members apart.

Although the joint structure described has been applied to a single pair of structural members, it will be understood that the structural members 10—10 may constitute a part of a composite beam structure or other structure composed of a plurality of members and that the joint structure herein described may be similarly applied to other members of such composite structures for joining the ends of various abutting members.

The structure of this invention is particularly advantageous for assembling heavy structural members and particularly such members when they are under load. For example, the members 10 may be a base member of a sectional skid structure on each section of which heavy machinery is mounted. This invention permits the rapid and accurate assembly of the loaded sections into an entire structure, and the provision of guide plug 28 and the guiding elements on the adjacent sections enables accurate alignment of the ends of the sections for connection. When assembled, the joint strength is substantially as great under all loading conditions as that of the members 10.

Fig. 7 illustrates the joint structure of this invention applied to the joining of members of standard channel shape. The channel web is designated by the numeral 32 and the top and bottom flanges by the numers 33 and 34, respectively. The other elements of the joint structure are identical with those in the previously described embodiment and are designated by the same numerals. The principal difference between the embodiment of Fig. 7 and that previously described is that the former requires fewer lugs 20 than the latter, but of course, the number of lugs is not critical but is dependent largely upon the sectional area of the joint and the joint strength desired.

It will be evident from the foregoing that this invention provides a novel form of reinforced tongue-and-groove joint for joining the ends of generally channel-shaped structural members and which has great strength and may be quickly and easily assembled and dis-assembled.

What I claim and desire to secure by Letters Patent is:

1. A joint structure for joining the abutting ends of a pair of generally channel-shaped structural members, comprising, groups of transversely spaced mutually inter-engaging upstanding lugs having registering transverse apertures therethrough mounted on the adjacent upper end surfaces of the upper and lower flanges enclosing the channels in said members, the lugs of one of said groups on one of said members being arranged to enter the spaces between the lugs of a group on the opposite member, an aligning element mounted in the channel of one of said members and a guide element therefor mounted in the corresponding channel of said other member, said elements being operative upon movement of the ends of said members toward each other to align the members to thereby bring said groups of lugs into inter-engagement and the apertures therein into registration, removable pin means extending through the registering apertures in the inter-engaged groups of said lugs for locking the ends of said members together, and spacer plates interposed between said groups of lugs and the upper surfaces of said flanges, the forward edges of the spacer plates having tongue-and-groove configuration and having one of said lugs mounted on each of the tongues thereof.

2. A joint structure for joining the abutting ends of a pair of generally channel-shaped structural members, comprising, complementary tongue-and-groove lug elements mounted on the abutting ends of said members in inter-engaging relationship, registering apertures extending through the inter-engaged tongues transversely of said members, spacer plates interposed between said members and said lug elements, the abutting ends of said spacer plates having inter-engaging tongues and grooves substantially registering with the tongues and grooves formed by said lug elements, an elongated aligning element mounted in the channel of one of said members and extending into aligning engagement with an apertured guide element mounted in the corresponding channel of the other member to thereby bring the apertures in said elements into registration, and means adapted to be removably inserted through the registering apertures to lock said structural members together.

3. A joint structure for joining the abutting ends of a pair of generally channel-shaped structural members, comprising, spacer plates mounted on the upper surfaces of each of the flanges enclosing the channels in said members, and adjacent the abutting ends thereof, the forward edges of each of said plates having complementary tongue-and-groove configuration for inter-engagement when the ends of said members are joined together, a plurality of upstanding lugs mounted on the upper surfaces of said plates, each of said lugs being mounted on one of said tongues and spaced from one another by said grooves, whereby the lugs on one of said members will enter the spaces between the lugs on the other of said members, apertures in said lugs adapted for registration when said members are joined together, an elongated aligning element longitudinally mounted in the channel of one of said members and cooperating with an apertured element mounted in the corresponding channel of the other member to align the members when they are moved toward each other and to thereby bring the apertures in said lugs into registration, and locking pins adapted to be removably inserted transversely through said registering apertures to lock said structural members together.

4. A joint structure for joining the abutting ends of a pair of H-beams, comprising, groups of mutually inter-engaging transversely apertured lug elements mounted upon abutting end surfaces of the upper and lower flanges enclosing the channels in said H-beams, said lug elements on one H-beam being positioned in generally tongue-and-groove relationship to those on the other, a pair of longitudinally spaced reinforcing plates positioned in the abutting end portions of said H-beams and extending transversely across said channels between said upper and lower flanges, an elongated aligning pin rigidly mounted in said reinforcing plates of one of said H-beams, and having a tapered end portion extending longitudinally therefrom toward the adjacent end of the other of said H-beams, longitudinally aligned apertures in said reinforcing plates of said other of said H-beams, said apertures being adapted to receive the extended end of said aligning pin in close fitting relationship, whereby to guide the ends of said H-beams into alignment and to bring said groups of lug elements into mutual inter-engagement and the apertures therein into registration, and removable pin means extending through the registering apertures in the inter-engaged groups of said lug elements for locking the ends of said H-beams together.

WAYLAND B. WOODY.